United States Patent [19]

Richard

[11] Patent Number: 4,702,122

[45] Date of Patent: Oct. 27, 1987

[54] BI-DIRECTIONAL ADVANCE GEAR HAVING A TORQUE LIMITING CLUTCH

[75] Inventor: Matthew D. Richard, Franklin, Tenn.

[73] Assignee: The Scott & Fetzer Company, Westlake, Ohio

[21] Appl. No.: 903,019

[22] Filed: Sep. 2, 1986

[51] Int. Cl.$^4$ .......................... F16H 1/02; F16D 7/02
[52] U.S. Cl. .................................. 74/412 TA; 74/438; 192/56 R; 464/37
[58] Field of Search .............. 74/412 R, 412 TA, 438; 464/37, 42, 43, 44; 192/56 R, 20

[56] References Cited

U.S. PATENT DOCUMENTS

| | | | |
|---|---|---|---|
| 1,562,442 | 11/1925 | Evans | 464/37 |
| 2,527,658 | 10/1950 | Sinclair | 192/56 R |
| 2,544,809 | 3/1951 | Stanley | 192/56 R |
| 2,802,557 | 8/1957 | Sebree | 192/56 R |
| 2,824,637 | 2/1958 | Unk et al. | 192/56 R |
| 3,019,595 | 6/1958 | Mürrle | 368/148 |
| 4,061,936 | 12/1977 | Woolley | 310/41 |
| 4,542,812 | 9/1985 | Westley | 464/43 |
| 4,606,443 | 8/1986 | Kimura | 192/20 |

FOREIGN PATENT DOCUMENTS 623303 12/1935 Fed. Rep. of Germany ........ 464/37
820659 11/1951 Fed. Rep. of Germany ........ 464/37

*Primary Examiner*—Leslie Braun
*Assistant Examiner*—Joseph J. Meter
*Attorney, Agent, or Firm*—Pearne, Gordon, McCoy & Granger

[57] ABSTRACT

A bi-directional advance gear having a torque limiting radial friction clutch is disclosed. The friction clutch comprises an annular member having an inner and outer periphery and having gear teeth defined by its outer periphery and radially inwardly projecting teeth on its inner periphery. A flat web substantially closes one face of the annular member to provide a shallow recess bounded by the projecting teeth and defines an opening concentric to the annular member. An inner member having a hub portion is rotatably mounted in the opening and has a pinion gear at one end. The other end of the hub has a plurality of radially extending rosette-shaped springs contained in the recess. Each spring has a pair of radially extending leg portions joined by an arcuate portion. Each arcuate portion has a lobe biased into engagement with the inwardly projecting teeth.

6 Claims, 6 Drawing Figures

BI-DIRECTIONAL ADVANCE GEAR HAVING A TORQUE LIMITING CLUTCH

BACKGROUND OF THE INVENTION

This invention relates to a torque limiting device and, more particularly, to a gear having a torque limiting, radial friction clutch. Speed-reducing gear trains include gear combinations comprising a relatively large gear and an integral, axially projecting pinion gear for reducing rotational speed and increasing torque through the gear train.

A wide variety of gear mechanism exist which receive input power from prime movers such as hydraulic or electric motors and multiply the torque output of the motor as a function of speed reduction for a desired high torque or slow speed output through the gear mechanism or train. For example, speed reducing mechanism sin the form of gear trains are employed in appliance timers wherein high-running torque synchronous motors are employed to drive the drum or disk-shaped timer cam which, in turn, sequentially actuates an array of leaf spring switch arms to electrically control the various functions of the appliance. Since the timer cam must be rotated at a relatively low speed to accomplish a variety of switching operations in one revolution, the gear train must greatly reduce the rotation speed of the motor. If a restraint is placed on the cam by a foreign object or a defective switch arm while it is driven, the normal operational torque of the gear train is greatly increased to a point where the gear teeth on one or more gears may be stripped. This is particularly true in those applications which employ plastic gears. Since the gears are assembled as a package with the motor, it is necessary to replace the entire gear train and motor assembly, or in many cases, the entire appliance timer, if a single gear should become stripped.

Many other mechanisms employing clock-type gear drives encounter similar problems where unexpected blockages are encountered by the power output of the gear train causing gear tooth stripping or dislodgement of a gear from its mounting shaft. Moreover, the output of the gear train may be manipulated to force the gears into an abnormally high torque load condition such as by, for example, moving the hands of a clock timing-device manually.

SUMMARY OF THE INVENTION

This invention provides a gear which is designed to function under predicted torque loading conditions including starting, acceleration, and running torque loads but which will act as a torque limiting radial friction clutch upon the application of torque loads exceeding the rated capacity of the gear. According to this invention, the gear comprises a relatively large outer gear member and a concentric projecting pinion gear adapted to rotate as a unit about a common axis upon the application of a predetermined input torque load to one of the gears to transmit the input torque as an output torque at the other gear. A radial friction clutch is provided between the outer gear and the pinion gear so that if the torque capacity of the gear is exceeded, the clutch will release to permit relative rotation of the gears in either directions. The friction clutch comprises a plurality of radially inwardly projecting teeth associated with the outer gear which may be sequentially engaged by a plurality of spring biased lobes associated with the pinion gear. The lobes are formed on arcuate portions of rosette-shaped leaf springs and the biasing force of the lobes may be increased by increasing the cross-sectional area of the spring to thereby increase its stiffness.

The gear according to this invention is formed from two sub-assemblies. A first sub-assembly comprises the relatively large outer gear which includes an annular member having gear teeth formed on its outer surface and the inwardly projecting teeth on its inner surface. One side of the annular member is provided with a web which substantially closes one face of the annular member and defines a shallow recess with the annular member. The web further defines an opening which is concentric to the annular member.

The other sub-assembly includes a hub having a pinion gear portion axially projecting in one direction and a plurality of rosette-shaped springs radially extending from the hub. The hub is adapted to interlock with the opening in the web when the pinion gear is inserted through the opening and the inwardly projecting teeth cooperate with the lobes to permit relative rotation of the gears if a predetermined torque load is exceeded.

DETAILED DESCRIPTION OF THE DRAWINGS

Figure 1:
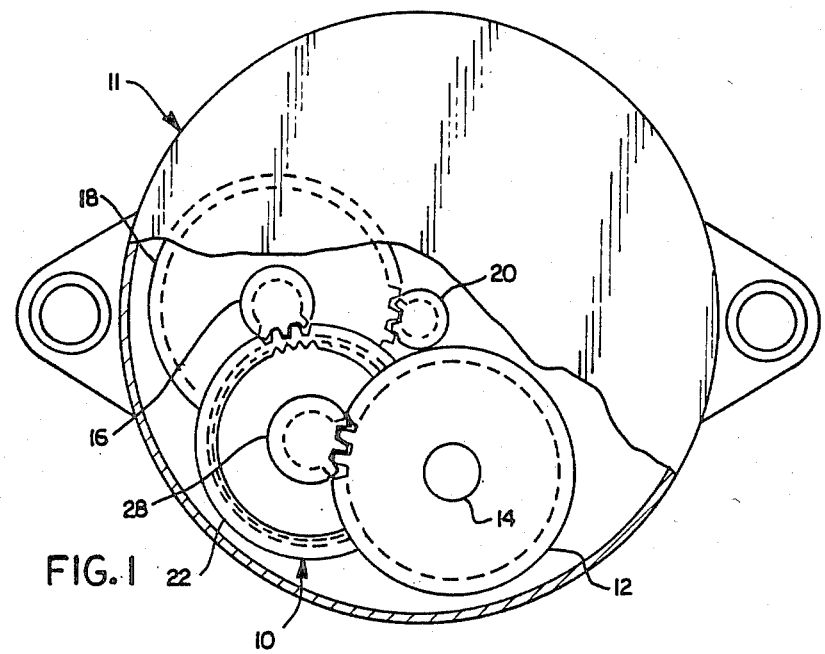
FIG. 1 is a fragmentary plan view of a timing motor and gear train assembly having a gear according to this invention.
Figure 2:
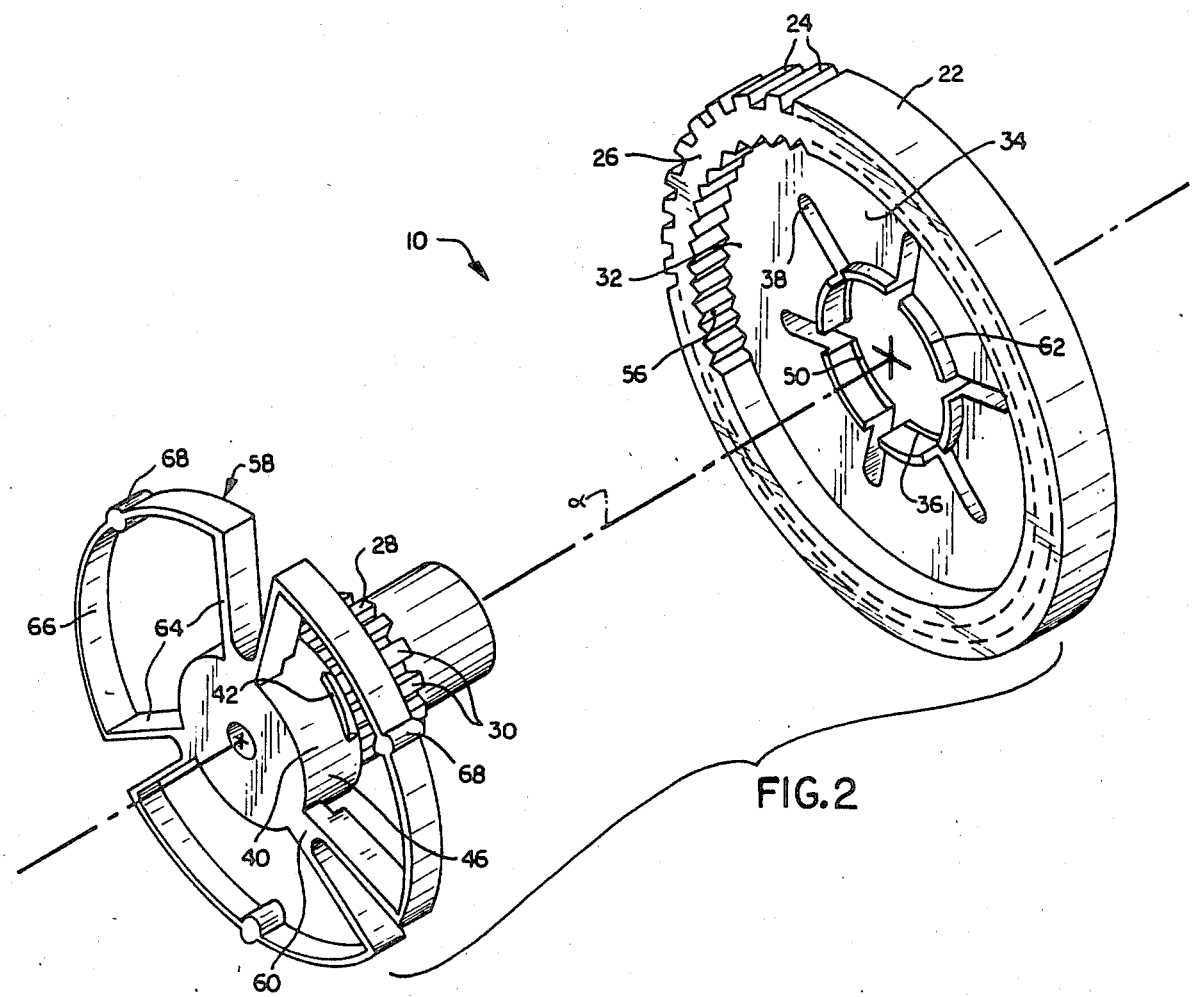
FIG. 2 is an exploded perspective view of the gear.
Figure 3:
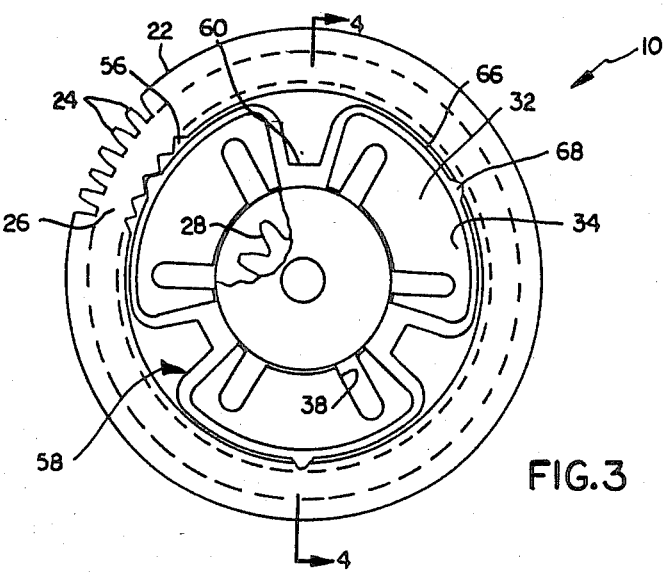
FIG. 3 is a fragmentary plan view of the gear.
Figure 4:
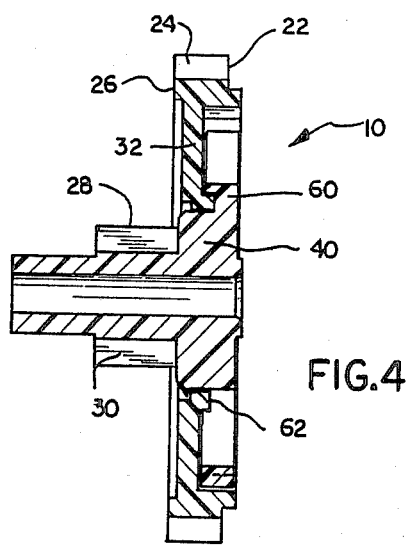
FIG. 4 is a cross-sectional view, the plan of the section being indicated by the line 4—4 in FIG. 3.
Figure 5:
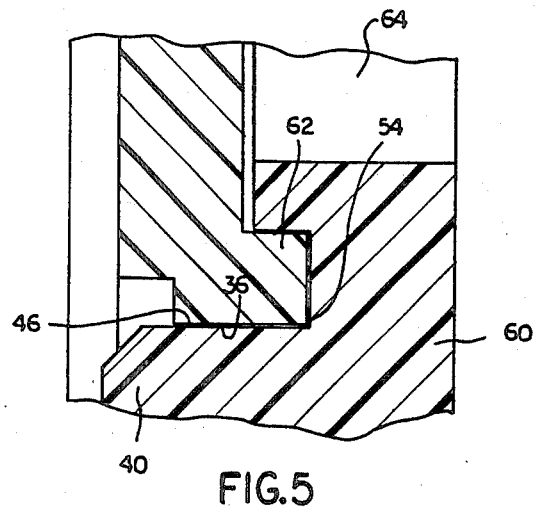
FIGS. 5 and 6 are fragmentary cross-sectional views showing the cooperation between the pinion hub and the web aperture.
Figure 6:
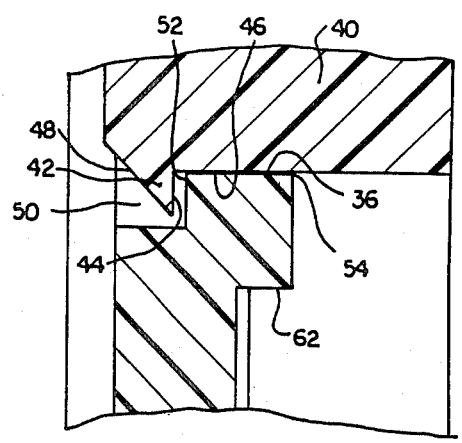

Referring now to the drawings, and particularly to FIGS. 1 and 2, there is illustrated a bi-directional advance gear 10 according to this invention. The advance gear 10 may be provided in an appliance timer motor assembly 11 such as the assembly disclosed in U.S. Pat. No. 4,061,936 and may comprise the integrally connected gears 56 and 57 shown in FIG. 5 of that patent and illustrated herein as being in a train of gears including integrally connected gears 12 and 14, integrally connected gears 16 and 18, and a drive gear 20. The gear 10 includes a relatively large outer gear 22 having gear teeth 24 formed on an annular ring member 26 and further includes a concentric projecting pinion gear 28 having pinion gear teeth 30. As will be understood, the gear 22 and the gear 28 are adapted to rotate as a unit upon a common axis $a$ upon the application of a predetermined input torque load to one of the gears 22 and 28 to transmit the input torque as an output torque at the other gear. For example, as is indicated in FIG. 1, input torque to the gear 10 may be applied by the gear 20 to the gear 22 and transmitted as an output torque to the gear 28.

A flat web 32 substantially closes one face of the annular member 26 to define a shallow recess 34 with the annular member. The web 32 defines an opening 36 and a plurality of slots 38 extend from the opening 36 toward the annular member 26. The pinion 28 is coaxially mounted in the opening 36 by a hub portion 40 which is provided with a plurality of projections 42. The projections 42 are formed by a ledge 44 which extends radially from a cylindrical bearing surface 46 of the hub and a conical surface 48 which tapers inwardly toward the pinion gear 28. The opening 36 is further defined by a recess 50 which provides a ledge 52. The pinion gear 28 and the hub are assembled in the opening 36 by inserting the pinion gear 28 in the opening so that the conical surface 48 engages an edge 54 of the opening 36. By forcing the pinion gear 28 further into the opening, the slots 38 permit the opening 36 to enlarge slightly and to permit the ledge 44 to axially interfere with the surface 52.

A torque limiting radial friction clutch is provided between the outer gear 22 and the pinion gear 28 and comprises a plurality of teeth 56 which project radially inwardly from the annular member 26 and form angles of 45 degrees to bisecting radii. The hub portion 40 is provided with a plurality of rosette-shaped springs 58 which extend from spoke sections 60 which interlock with a rim portion 62 of the opening 36. The rosette-shaped springs 58 include radial arms 64 which extend from the spoke sections 60 and which are connected by arcuate leaf spring portions 66. The arc of each leaf spring portion 66 is concentric with the annular member 26 and each spring portion has a relatively thin section compared to the section of the arms 64 so that it may function as a leaf spring. Each leaf spring biases a conically-shaped lobe 68 into friction engagement with the teeth 56 to permit the gears 22 and 28 to rotate as a unit at torque values less than a predetermined limiting torque value dependent upon the magnitude of frictional engagement between the lobes 68 and the teeth 56. Thus, if the gear 10 is designed to operate at predetermined starting, acceleration, and running torque values, the frictional engagement between the lobes 68 and the teeth 56 may be designed to withstand those torque values and permit the gears 22 and 28 to operate as a unit. However, if those torque values are exceeded due to sudden unexpected increases in the input or output torques, the lobes 68 are adapted to slip relative to the teeth 56 with no consequent damage to the gear teeth 24 or 30 since either the gear 22 or the gear 28 will remain stationary during such slippage.

The torque limit of the gear 10 may be increased or decreased by increasing or decreasing the frictional engagement between the lobe 68 and the teeth 56. This may be accomplished for example, by varying the number of lobes 68 on the leaf springs, by varying the cross-sectional are of the leaf springs 66, by varying the arcuate extent of the leaf spring 66, or a combination of these procedures.

Although the preferred embodiment of this invention has been shown and described, it should be understood that various modifications and rearrangements of the parts may be resorted to without departing from the scope of the invention as disclosed and claimed herein.

What is claimed is:

1. A bi-directional advance gear having a torque limiting radial friction clutch comprising an annular member having an inner and outer periphery and having gear teeth defined by its outer periphery and radially inwardly project teeth on its inner periphery, a flat web substantially closing one face of said annular member to provide a shallow recess bounded by said projecting teeth and defining an opening concentric to said annular member, an inner member having a hub portion rotatedly mounted in said opening, a pinion gear portion axially projecting in one direction from said hub portion and a plurality of rosette-shaped springs radially extending from said hub and being contained in said recess, each said spring having a pair of radially extending leg portions joined by an arcuate portion, each arcuate portion having a lobe biased into engagement with said inwardly projecting teeth.

2. A bi-directional advance gear according to claim 1 wherein each said lobe has a rounded configuration and wherein sides of said projecting teeth form an angle of 45 degrees with respect to imaginary radial lines bisecting said teeth.

3. A bi-directional advance gear according to claim 2 wherein said flat web includes means defining a plurality of radial slots from said opening toward said annular member, said means defining said opening in said web including an annular rim having a recessed ledge projecting into said shallow recess, said hub having radial projections cooperating with said recessed ledge to axially retain said hub within the said opening and to permit rotation of said hub in said opening.

4. A bi-directional advance gear having a torque limiting radial friction clutch comprising an outer gear and a concentric projecting pinion gear adapted to rotate as a unit upon a common axis upon the application of a predetermined input torque load to one of said gear to transmit the input torque as an output torque at the other gear, radial friction clutch means between said outer gear and said pinion gear, said radial friction clutch means comprising radially inwardly projecting teeth associated with said outer gear sequentially engaged by at least one radially outwardly projecting lobe associated with said pinion gear, spring biasing means urging said lobe into engagement with said teeth, said spring biasing means including a rosette-shaped leaf spring having a pair of radially extending leg portions joined by an arcuate portion, said lobe projecting from said arcuate portion, said clutch having a torque capacity exceeding said input torque and being releasable when said torque capacity is exceeded to permit relative rotation of said gears in either direction.

5. A bi-directional advance gear according to claim 4 wherein said radial friction clutch means comprises a plurality of lobes.

6. A bi-directional advance gear according to claim 5 wherein said spring biasing means includes a plurality of rosette-shaped leaf spring each having a pair of radially extending leg portions joined by an arcuate portion and wherein each of said lobes projects from an arcuate portion, each said arcuate portion being defined by an imaginary circle concentric with said gears.

* * * * *